Jan. 4, 1966 E. F. MORENO ETAL 3,227,237
STEERABLE DRIVING AXLE
Filed April 23, 1962 5 Sheets-Sheet 1
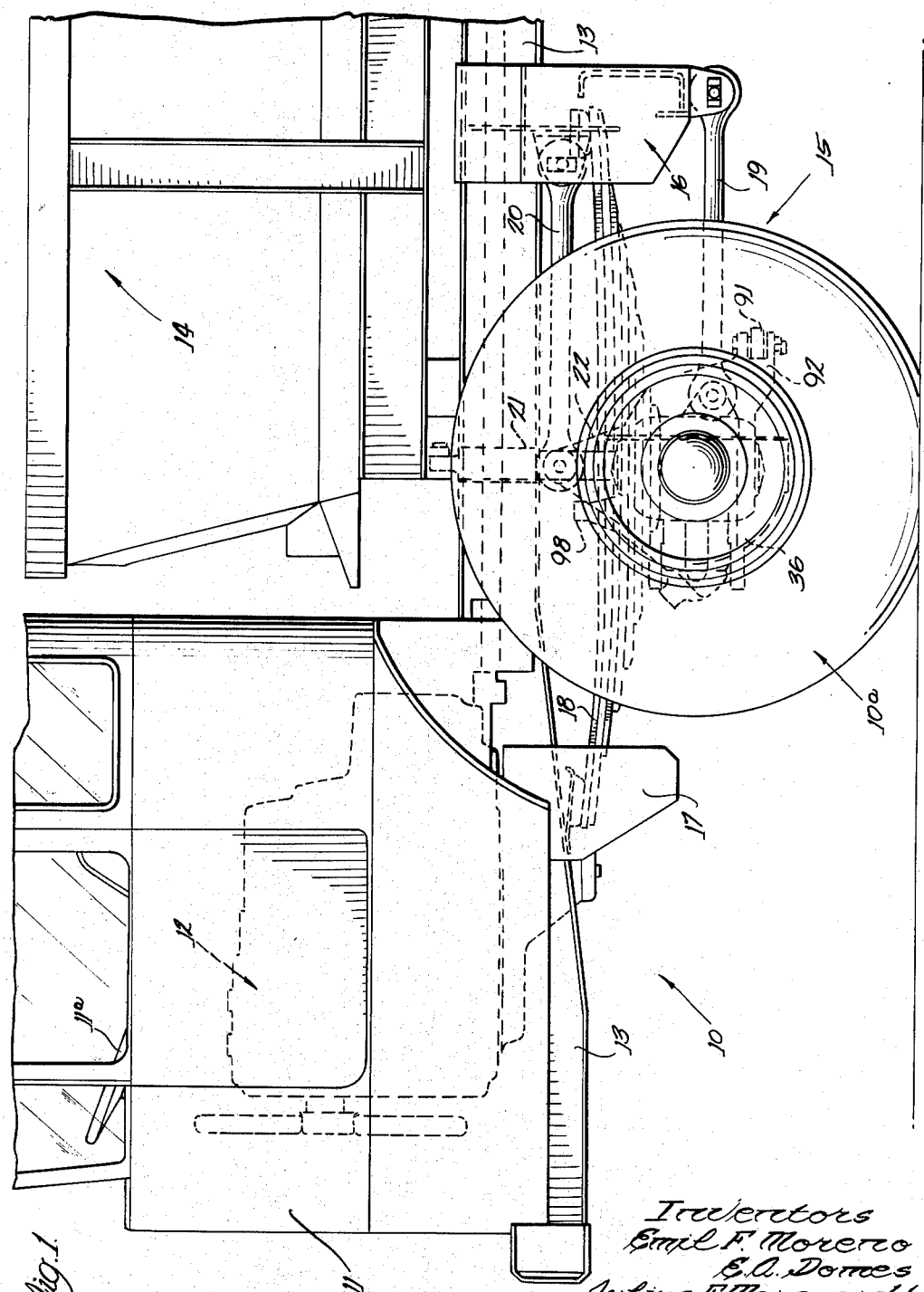
Inventors
Emil F. Moreno
E. A. Domes
Julius F. Marquardt
Paul O. Pippel
Attorney

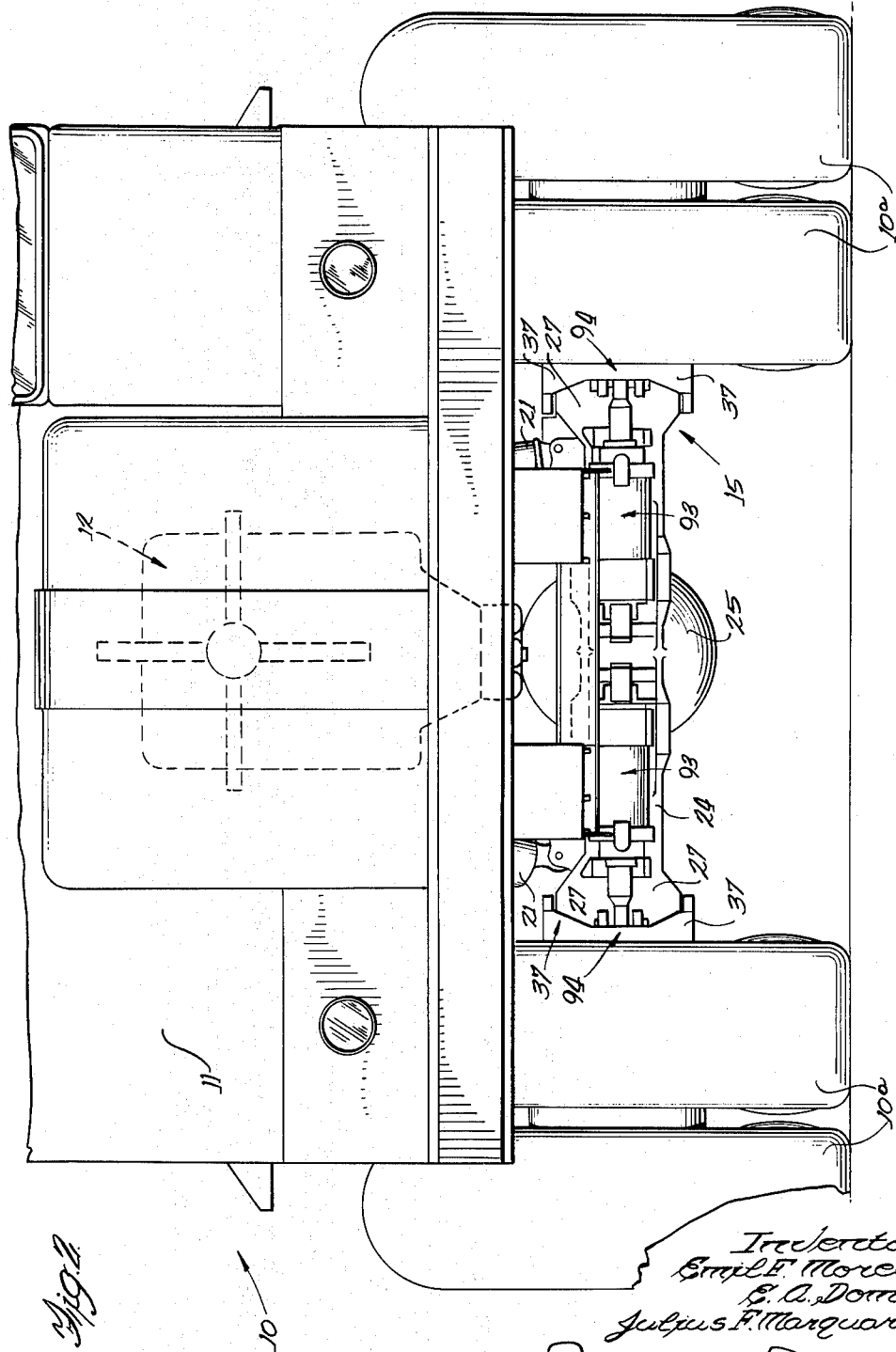

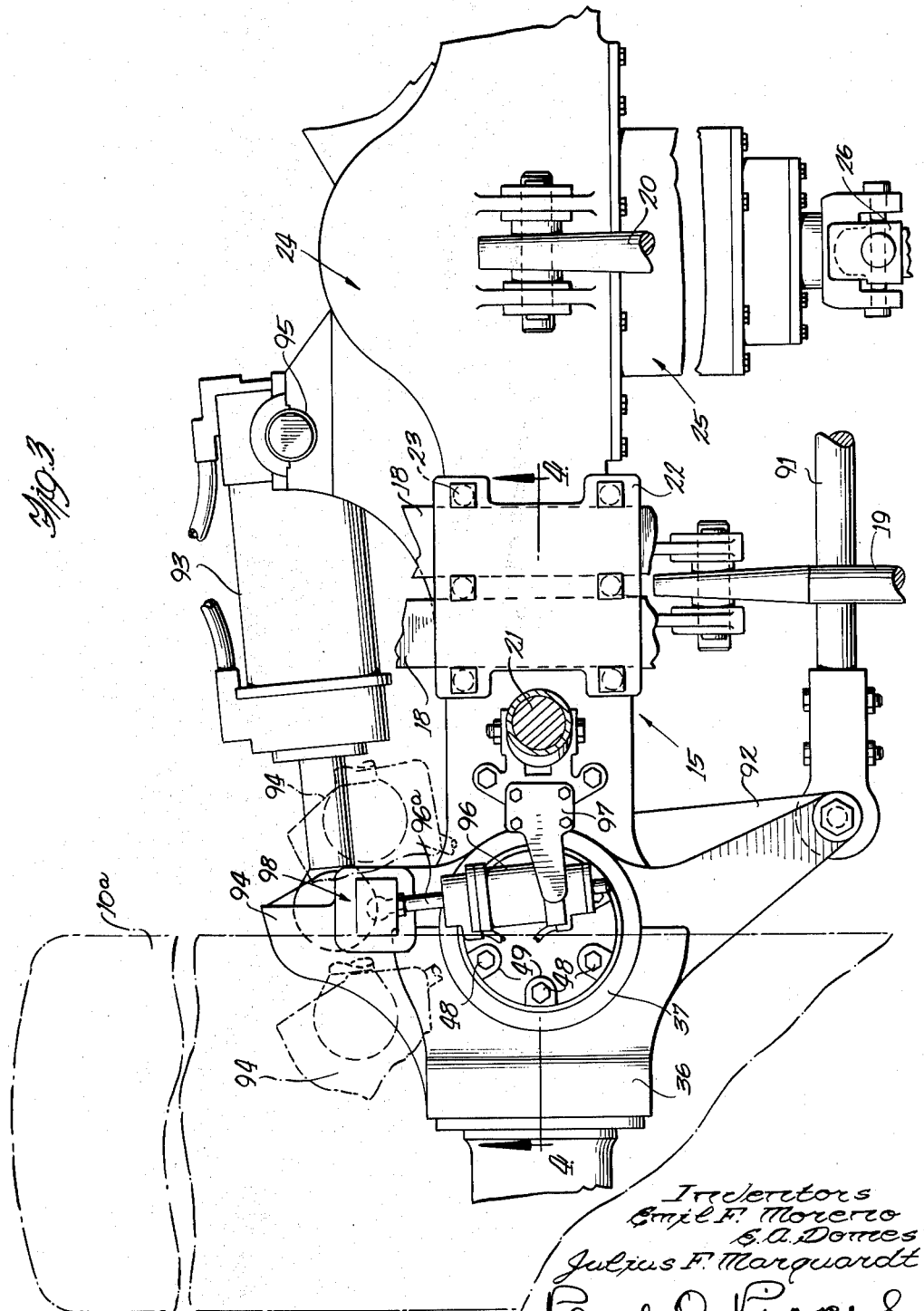

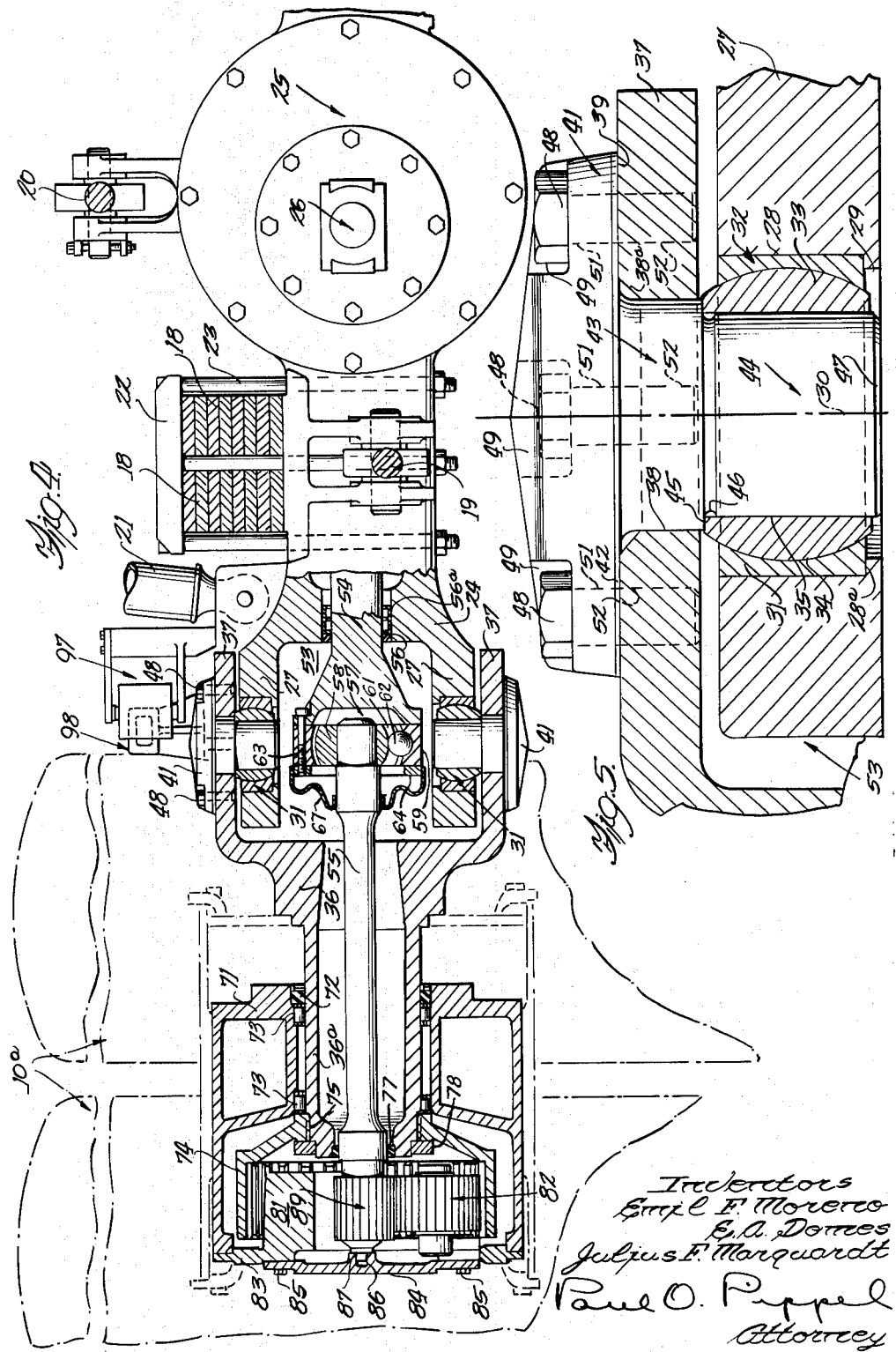

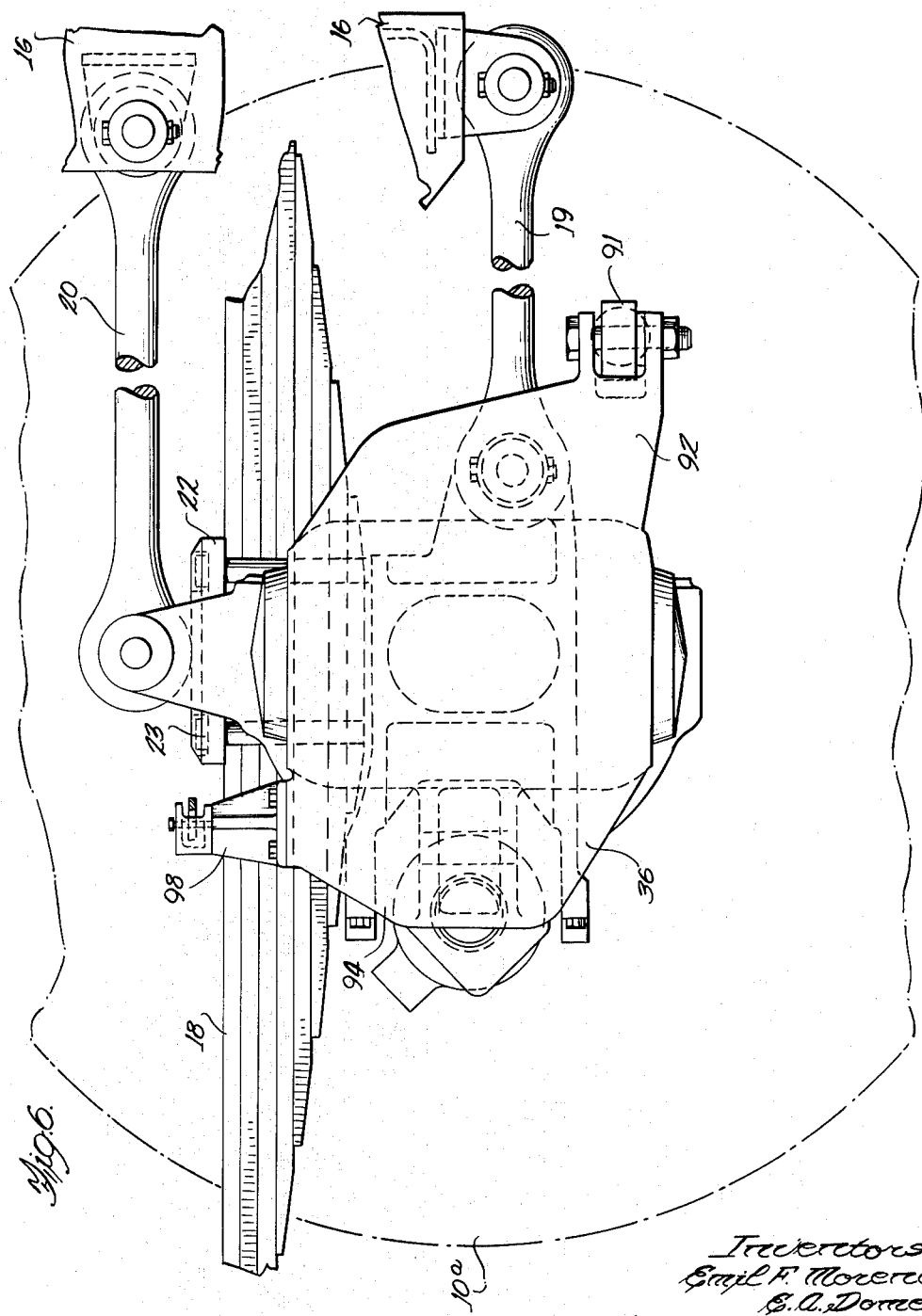

United States Patent Office 3,227,237
Patented Jan. 4, 1966

1

3,227,237
STEERABLE DRIVING AXLE
Emil F. Moreno, Melrose Park, E. A. Domes, Chicago, and Julius F. Marquardt, Westchester, Ill., assignors to International Harvester Company, Chicago, Ill., a corporation of New Jersey
Filed Apr. 23, 1962, Ser. No. 189,488
3 Claims. (Cl. 180—43)

This invention relates to improvements in a steerable driving axle comprising a drive and driven shaft supporting structure and more particularly to a quickly disassemble driven shaft supporting structure when used on a steerable driving axle.

One of the objects of the present invention is to provide a steerable driving axle comprised of two housing members with one of the housing members movable relative to the other housing member through a steering means.

Another object of the present invention is to provide a steerable driving axle comprising two housing members interconnected at one end through a pair of spaced-apart trunnions in one of the members and a pair of trunnion openings in another of the members, such that one of the interconnected housing members is steerable relative to the other housing member about the steering axis passing through the trunnions.

Another object of the present invention is to provide a steerable driving axle comprised of two housing members interconnected at one end by a pair of trunnions in one of the housing members and a pair of trunnion openings in the other housing member, such that two drive shafts one in each housing member are interconnected through a constant velocity universal joint lying along the steering axis providing rotation of the two drive shafts during steering of one of the interconnected housing members about the steering axis.

An object of the present invention is to provide a steerable driving axle comprised of two interconnected housing members at one end through a pair of opposite spaced apart assembled trunnions in trunnion openings such that two drive shafts one in each housing member are interconnected at one end through a universal joint lying along the steering axis and providing rotation of the two drive shafts during steering of one of the interconnected housing members about the steering axis. Further, a novel bearing arrangement between the assembled trunnions and trunnion openings always lies on the steering axis and also permits the relative pivotal movement of the assembled trunnions so as not to affect the steering axis of the interconnected housing members.

Another object of the present invention is to provide a steerable driving axle comprised of two interconnected housing members at one end through a pair of opposite spaced apart trunnions and trunnion openings such that two drive shafts one in each housing member are interconnected at one end through a universal joint lying along the steering axis and providing rotation of the two drive shafts during steering of one of the interconnected housing members about the steering axis. Further a bearing, positioned between the trunnion and opening and located along the steering axis, is adapted to take the axial and radial loads of the interconnected housing members during steering and movement of the steerable driving axle.

Other objects and features of the present invention will be apparent upon a perusal of the following specification and drawing of which:

FIGURE 1 is a side elevational view of the steerable driving axle in relation to the operator's cab and dump body shown in fragmentary view;

FIGURE 2 is a front elevational view showing the steerable driving axle in relation with the front of the operator's cab on the truck frame.

2

FIGURE 3 is a top plan view of the steerable driving axle with the truck chassis and body removed;

FIGURE 4 is a longitudinal cross sectional view of the important parts of the subject invention along section line 4—4 in FIGURE 3;

FIGURE 5 is an exploded view of one spherical bearing assembly in FIGURE 4 to show important cross sectional details of the subject invention; and FIGURE 6 is a side view of the steerable driving axle with the planetary gear set and brake shoes and brake shoe support spider removed.

The present embodiment is the preferred embodiment but it is to be understood that changes can be made in the present embodiment by one skilled in the art without departing from the spirit or scope of the present invention.

For a detailed description of the present invention, continued reference is made to the drawings. FIGURES 1 and 2 show an off-the-road highway truck vehicle of general construction 10 comprising an operator's cab 11 including therein a prime mover or engine shown by broken lines 12 positioned over the front end of a one-piece chassis frame 13 which extends the length of the vehicle with a loadable dump body 14 positioned over the rear portion of the frame 13. A steerable driving axle generally indicated by reference number 15 is positioned below the frame 13 substantially between cab 11 and loadable dump body 14. As shown in FIGURE 2 the steerable driving axle 15 supports dual tires 10a on either wheel-end for heavy duty application. The steerable driving axle 15 is resiliently supported below frame 13 by a leaf spring 18 on either side of the vehicle with only one side shown in FIGURE 1. The spring 18 at either end is connected to the underneath portion of the frame 13 to a cross frame member generally indicated by reference number 16 and 17. At its center portion the spring 18 comprising a plurality of leaf spring members is attached to the steerable driving axle through plate 22 and a plurality of fastening bolts one only being indicated as 23 in FIGURES 3 and 4.

To further properly locate the driving axle 15 with respect to the frame 13 a lower rod member 19 on each side one being shown in FIGURE 1 is connected at one end to the lower portion of the cross frame member 16 and at the other end to a driving axle housing member 24 as shown in FIGURES 3, 4 and 6. An upper rod member 20 located substantially at the center of the steerable driving axle 15 as shown in FIGURES 3 and 4 is connected at one end to the driving axle housing member 24 and at the other end to the cross frame member 16 as shown in FIGURE 1. These rod members 19 and 20 are pin connected to the cross frame member 16 and the axle housing member 24 to provide limited pivotal movement but to properly locate steerable driving axle 15 during assembly to the truck frame 13 as well as assure proper position of the steerable driving axle 15 during operation of the truck vehicle. Two shock absorbers 21 shown partly in FIGURE 2 pinned at the lower end to housing member 24 and pinned at the upper end to the upper portion of the chassis frame 13 absorb the rebound energy of the leaf spring 18 during operation of the truck vehicle.

As shown in plan view in FIGURE 3 drive shaft 26 connected to the rear axle, not shown, receives rotary power from the engine 12 through connecting shafts in a conventional manner, also not shown, to rotate the differential gearing in the differential portion 25 of the housing member 24. As shown in FIGURE 4 the outer end of the housing member 24 includes an inner yoke portion 27 within the outer yoke portion 37 of the outer housing member 36. An exploded view in FIGURE 5 shows the details of the upper half yoke portion connection and it is to be understood that the lower half yoke portion corresponds in detail. The yoke portion 27 of the housing member 24 has a transverse bore 28 extending a substantial length of the cross section to connect with the smaller bore 29 with a connecting shoulder face therebetween. Bearing 31 is mounted in a suitable manner such as by a forcible fit in the bore 28 and comprises an outer race element 32 and an inner race element 33. The outer surface of race element 32 fits in the bore 28 against the shoulder face connecting the smaller bore 29. The inner race 33 is connected to the outer race 32 through an interengaging spherical surface 34 having a radius of curvature with its center point located on the steering axis 30.

The outer yoke member 37 has an opening or bore 38 therethrough with a beveled portion at the outer end 38a connected to the outer face wall 39. A trunnion or cap member 41 has a neck portion 43 that connects with a reduced extension portion 44 through a connected shoulder face 45 and a reduced annular groove 46. The outer end of the reduced extension portion 44 has a radial end face 47 with a beveled portion not indicated therebetween. The purpose of the trunnion member 41 is to assemble the outer yoke portion 37 to inner yoke portion 27 through the bearing 31 mounted in the opening 28 against the shoulder face 28a. Thus the neck portion 43 slidably fits in the circular opening 38 of the yoke portion 37 and also slidably fits in the circular opening 35 of the inner race element 33 with the shoulder face 45 of the member 41 abutting against the outer end face of the inner race element 33. Trunnion member 41 is securely fastened to the outer yoke portion 37 through a plurality of six bolts 48 positioned in the recesses 49. The fastening bolts 48 slidably pass through circular openings 51 in the trunnion member 41 to threadedly engage threaded openings 52 in the outer yoke portion 37 of the outer steering housing member 36.

A drive shaft 54 extends from the differential 25 to within the clearance portion 53 between the two interconnected yoke portions 27 and 37 of the driving axle housing members 24 and 36. Driven shaft 55 within housing 36 is connected to the drive shaft 54 through a constant velocity universal joint 57 that comprises inner race member 58 having a splined opening for a splined connection to the driven shaft 55; an outer race member 59 is fastened to the end of the drive shaft 54 by a fastening bolt 63 extending through aligned bore openings in the drive shaft and outer race 59 to the annular fastening member 64 having an aligned threaded opening therein to engage the threaded portion of the fastening bolt 63. Although only one bolt 63 is shown it is to be understood more bolts are provided for a firm universal joint assembly. The bearing cage member 61 is located between the spherical surfaces of the inner and outer race members 58 and 59 to properly locate the plurality of ball bearings 62, only one being shown, so that a constant velocity universal joint can be maintained between the connecting shafts 54 and 55 regardless of their relative position. The center of the spherical surfaces of the bearing members 58, 59 and bearing cage member 61 are located on the steering axis 30, so that the opposite spaced apart bearings 31 and these members 58, 59 and 61 of the universal joint 57 cooperate to provide steering of the outer housing member 36 relative to the inner housing member 24 about the steering axis 30. The members 58, 59 and 61 are protected from dust and foreign solids within the enclosed clearance space 53 through an attachable dust seal 67. Seal 56 and roller bearing 56a of conventional construction are mounted in the outer reduced opening of the inner housing member 24 to prevent entrance of dust to the differential 25 and to support the outer end of the drive shaft 54. Driven shaft 55 extends through the outer housing member 36 to pass through the outer dust seal 77 of conventional construction to a sun gear 89 integrally formed at the outer end thereof.

An outer reduced portion 36a of the outer housing member 36 rotatably supports an annular wheel 71 that is mounted on tapered roller bearings 73 having a seal of conventional construction 72 at the inner end. The outer end of the annular wheel 71 has therein a reaction ring gear member 74 of a planetary gear unit splined connected at 75 to the outer splined end of outer housing reduced portion 36a. The splined portion of the reaction member 74 is securely fastened against one of the tapered bearings 73 on housing member 36a through a plate 78 fastened to the outer end face of reduced portion 36a. Planetary gear unit body portion 81, comprising a series of planetary gears with one planetary gear 82 shown in FIGURE 4, is attached to the annular wheel 71 through the plate portion 83 by a plurality of bolts and locating pins. A cover plate 84 is fastened to the planetary gear unit body 81 through bolts 85 and it centrally locates through the inside centering recess 86 the outer end of driven shaft 55 having the cooperating reduced extension portion 87 integral with the driven shaft sun gear 89. Thus as the driven shaft 55 is rotated by the drive shaft 54, the sun gear 89 rotates the planetary gears 82 against the inside peripheral gear of the fixed ring gear reaction member 74 on the housing member 36, thereby causing the planetary unit 81 to rotate the annular wheel 71 with the dual wheels 10a mounted thereon through a dual rim assembly of conventional construction generally shown in broken lines in FIGURE 4. Although FIGURE 4 shows only the details of construction of the left outer housing member 36 including its steering interconnection with the inner housing member 24 on the left side of the truck vehicle, it is to be understood that the right outer housing member 36 corresponds in construction.

A power steering circuit not shown in detail but of conventional construction in the art cooperates with the operator's steering wheel 11a in the operator's cab to control the power steering cylinders 93 connected to the inner housing member 24 at one end through trunnions 95 and the rod portion of the cylinder 93 connected to an extending arm portion 94 of the steerable outer housing member 36 as shown in FIGURE 3. To assure that the power cylinder 93 is functioning properly a follow-up motor 96 is mounted to a fixed supporting bracket 97 attached to the inner housing member 24 adjacent the shock absorber mounting as shown in FIGURES 3 and 4. Rod portion 96a is attached to a bracket 98 mounted on the arm portion 94 of the outer housing member 36 above the rod connection of the power cylinder 93. As shown in FIGURE 2 there are power cylinders 93 for each steerable outer housing member 36 which is connected to the inner housing member 24 through the interconnecting yoke portions 27 and 37 previously described.

In view of the foregoing discussion of the details of the subject invention an operation of the subject invention will now be set forth. Thus as the operator in rotating the steering wheel 11a indicates change in direction of the moving vehicle, hydraulic pressure fluid from the steering circuit, not shown, is communicated to both power cylinders 93 to steer the axle of outer housing members 36 of the steerable driving axle 15. Assume that the vehicle is to be steered to the left as indicated by the broken lines of the outer housing arm portion 94 in the left-most position in FIGURE 3, power fluid at the piston end of the actuator 93 moves the piston rod over to the left position as shown by the broken lines while the right power cylinder 93 on the right side would have power fluid at its rod end so as to move the right wheels 10a in a corresponding left direction. Tie rod 91 is connected by pins at either end to another arm portion 92 formed rearwardly and integrally to the outer steering housing members 36, only one pinned connection being shown in FIGURE 3. The purpose of the tie rod 91 is to assure mechanical steering coordination between the two steerable outer housing members 36 when moved by the power cylinders 93 of the steering circuit. The follow-up motor 96 relays a pressure impulse to the power steering circuit which will center the control valve when a pressure impulse is no longer produced by the steering pump. Similarly the same operational results would occur when the left wheels 10a in FIGURE 3 are moved to the right as indicated by the extreme right position of the arm portion 94 as shown by the right broken lines in which the rod is fully retracted within the power cylinder 93. The details of the steering circuit, other than cylinder 93 for example, have not been shown completely since the steering circuit is not the subject invention but has been partially shown to further understand the subject invention.

In steering the two outer housing members 36 relative to the inner housing member 24 of the steerable driving axle 15 through the above generally described fluid power steering circuit, the steering axis 30 is always located along the center of the universal joint 57 and the center of each of the outer spaced-apart bearings 31. If the outer housing member 36 is to be disassembled from the inner housing member 24, the trunnion members 41 are easily removed by removal of fastening bolts 48. With the inner housing member 24 properly supported by jacks for example, the unfastened trunnions 41 are disassembled from the opening 35 of bearing 31. During use of the interconnected yoke portions of the subject invention including initial assembly of the interconnected yoke portions, the spaced-apart bearings 31 may not be sufficiently preloaded. Normally the assembled trunnion member 41 through its bearing contacting shoulder face 45 on the outer end face of inner race 33 sufficiently preloads the interengaging spherical surface 34 of the bearing 31. However if the bearing 31 is overloaded during preloading, shims can be placed between the contacting faces 42 and 39 of trunnion 41 and yoke portion 37 to relieve the force of contact of trunnion shoulder 45 against outer end face of inner race 33 and thereby result in sufficiently preloaded bearings 31. Once the bearings 31 are properly pre-loaded, the interengaging spherical surface 34 is able to take axial and radial loads occurring between the interconnected housing members 24 and 36 during operation of the steerable driving axle 15 on the truck vehicle 10.

The steering axis 30 is determined by the centerlines of the outer races 32, which are not necessarily vertical, but which must be in axial alignment with each other. As will be apparent, this alignment of the outer races can be readily accomplished since both of the outer races are positioned in the same member, viz., the inner yoke portion 27, which permits the bore 29 and the counter bore 28 to be machined in a single operation and thus accurately. Therefore, the outer surfaces 42 of the outer yoke portion 37 do not necessarily have to be parallel to each other, nor must they be parallel to the outer surfaces of the inner yoke 27, i.e., the axes of the trunnions 41 need not be parallel to the centerlines of the outer races 32. Any misalignment will be compensated for by rotation of the inner races 33 relative to the outer races 32. Thus the axes of the trunnions 41 could be skewed relative to each other, or relative to the steering axis 30 and steering would still be accomplished about the predetermined steering axis by virtue of the universal bearing 31. Also, uniform load application and proper pre-loading of the bearing 31 is achieved regardless of the non-alignment of the trunnions 41 due to the ability of the inner race 33 to rotate and thereby prevent point contact between the shoulder 45 on the trunnion 41 and the outer end face of the inner race 33.

While the power drive shaft 54 is rotating the driven shafts 55 and planetary gears 82 to rotate the wheels 10a for movement of the truck vehicle, the outer housing member 36 can readily be steered about the steering axis 30 relative to the inner housing member 24 through the operator's movement of the steering wheel 11a to actuate the steering circuit and power actuator 93 described generally above. The universal joint during this steered movement of the outer housing member provides relative movement between the shafts 54 and 55 while maintaining rotation therebetween. Suitable clearance space 53 is provided to prevent any interference between the interconnected yoke portions 27 and 37 for the universal joint 57, and for relative movement of the yoke portions 27 and 37 during steering.

It should now be apparent that since the steering axis 30 lies along the universal joint and the center of each of the spherical bearing surfaces 34 that the axis of the drive shaft 54 is perpendicular to the steering axis 30 and at least one plane passing through the steering axis 30 during movement of the outer housing member 36 with the driven shaft 55. Although the steerable driving axle 15 of the subject invention is shown on the front supporting axle of the truck vehicle it is not intended to be the particular use, but could be used on rear supporting axles of a truck vehicle if a rear steerable driving axle is needed.

The outer housing member 36 can readily be disassembled into any number of parts. Outer plate 84 can be unfastened to easily remove driven shaft 55. Next, the planetary gear unit can be unfastened from the annular wheel 71. Then if the dual wheels are removed with sufficient jack support on the inner housing member 24, the reaction member 74 and wheel 71 can be removed by suitable tools upon removal of fastened plate 78. Then the outer housing member 36 can be disassembled from the yoke interconnection by removal of trunnion members 41 as discussed previously.

What is claimed for Letters Patent is:

1. In a steerable driving axle having a driving shaft, a driven shaft, a universal joint interconnecting said shafts, a rigid housing encasing said driving shaft, and another rigid housing encasing said driven shaft, the improvement comprising first and second yokes in overlapping relationship, each of said yokes being secured to the end of a respective housing, a pair of axially aligned bores in the first yoke, a pair of universal bearings having inner and outer races, said outer races secured to the bores in the first yoke in axial alignment with each other and defining thereby a steering axis, said inner races having universal motion with respect to the outer races, a pair of trunnions secured to the second yoke and extending into engagement with said inner races whereby misalignment of said trunnions during manufacture will be compensated for by rotation of said inner races relative to said outer races.

2. A steerable driving axle as described in claim 1, further including means to vary the axial position of the trunnions with respect to said second yoke whereby the amount of preloading of the universal bearings may be varied.

3. In a steerable driving axle having a driving shaft, a driven shaft, a universal joint interconnecting said shafts, an inner housing encasing said driving shaft, and an outer housing encasing said driven shaft, the improvement comprising a yoke portion integral with the end of each of said housings, one of said yoke portions overlapping the other of said yoke portions, a pair of universal bearings having inner and outer races, said outer races secured to the underlying yoke portion in axial alignment with each other and defining thereby a steering axis, said overlying yoke portion having a pair of openings therein, a pair of members having a face portion and a trunnion portion, means for attaching each of said face portions to the outer surface of said overlying yoke portion with said trunnion portions extending through said openings, shims insertable between said face portions and said overlying yoke portions, each of said trunnion portions having a section of reduced diameter forming a shoulder, the distance from said face portion to said shoulder being greater than the thickness of said overlying yoke portion, said reduced diameter sections being engaged by said inner races and said shoulders engaging the outer edges of said inner races whereby the amount of pre-loading on said universal bearing may be controlled by the insertion of shims between said face portions and said overlying yoke portion.

References Cited by the Examiner
UNITED STATES PATENTS

| | | | |
|---|---|---|---|
| 1,407,911 | 2/1922 | Batenburg | 180—43 |
| 2,115,256 | 4/1938 | Eckenrode | 280—96.1 |
| 2,623,604 | 12/1952 | Keese | 180—43 |
| 2,685,184 | 8/1954 | De Nador et al. | 180—43 X |
| 2,785,907 | 3/1957 | Hutchens et al. | 280—96.3 |
| 2,801,702 | 8/1957 | Armington | 180—43 |

A. HARRY LEVY, *Primary Examiner.*